United States Patent [19]

Davis et al.

[11] Patent Number: 4,648,015

[45] Date of Patent: Mar. 3, 1987

[54] FILTER CAPACITOR DISCHARGE CIRCUIT FOR A DC-DC CONVERTER

[75] Inventors: Walter L. Davis; Stephen H. Woltz, both of Plantation, Fla.

[73] Assignee: Motorola, Inc., Schaumburg, Ill.

[21] Appl. No.: 869,804

[22] Filed: May 29, 1986

Related U.S. Application Data

[63] Continuation of Ser. No. 657,637, Oct. 4, 1984.

[51] Int. Cl.$^4$ .............................................. H02M 3/00
[52] U.S. Cl. .................................... 363/15; 361/54; 320/1
[58] Field of Search ................. 320/1; 361/86, 88, 92, 361/54, 56; 363/15, 50; 307/109; 323/223, 299

[56] References Cited

U.S. PATENT DOCUMENTS

| | | | |
|---|---|---|---|
| 3,389,704 | 6/1968 | Buchowski et al. | 128/419 D |
| 3,766,433 | 10/1973 | Nowell | 320/1 |
| 3,873,905 | 3/1975 | Marek | 323/350 |
| 3,885,572 | 5/1975 | Chen | 320/1 |
| 3,982,173 | 10/1976 | Berry | 361/56 |
| 4,004,160 | 1/1977 | Streit et al. | 307/253 |
| 4,355,277 | 10/1982 | Davis et al. | 323/351 |
| 4,446,499 | 5/1984 | Kishimoto et al. | 361/92 |
| 4,451,772 | 5/1984 | Moberg et al. | 320/1 |
| 4,595,972 | 6/1986 | Davis et al. | 363/15 |

Primary Examiner—Patrick R. Salce
Assistant Examiner—Jeffrey Starrett
Attorney, Agent, or Firm—Daniel K. Nichols; Joseph T. Downey; Donald B. Southard

[57] ABSTRACT

A power supply circuit includes a battery power source connected by a switch to the input of a DC to DC converter. The output of the DC to DC converter is connected to a filter capacitor and a load. A crow-bar is connected to the input and the output of the DC to DC converter. The crow-bar shorts the output to ground to discharge the capacitor when the voltage at the input drops to a predetermined value.

4 Claims, 4 Drawing Figures

U.S. Patent    Mar. 3, 1987    4,648,015
PRIOR ART
Fig. 1
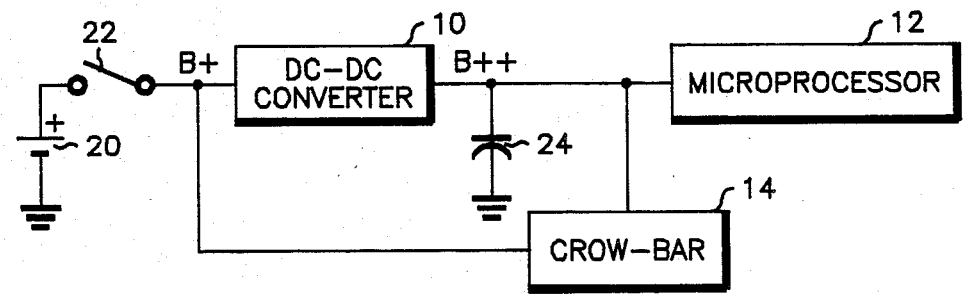
PRIOR ART
Fig. 2
Fig. 3
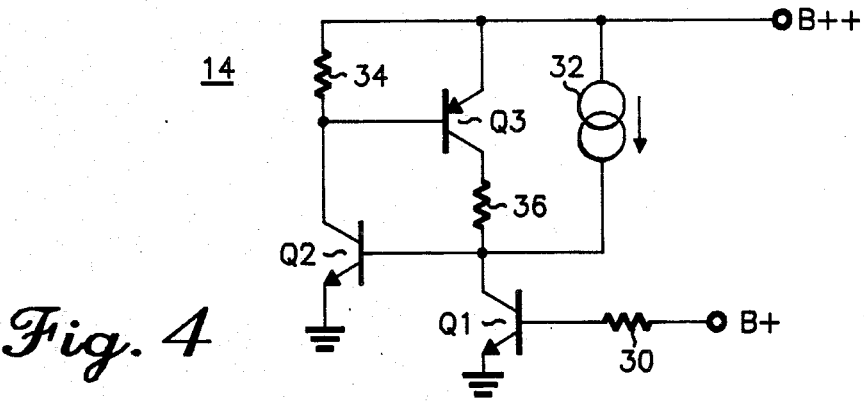
Fig. 4

FILTER CAPACITOR DISCHARGE CIRCUIT FOR A DC-DC CONVERTER

This is a continuation of application Ser. No. 657,637, filed Oct. 4, 1984.

BACKGROUND OF THE INVENTION

This application relates to power supply circuits in general, and in particular, to a power supply circuit utilizing a crowbar. A typical prior art power supply circuit utilizing a crowbar is illustrated in FIG. 1.

In this conventional circuit, a power supply provides power to a load and a circuit interruption element, such as fuse 11, is utilized to disconnect the load from the power supply in the event of an over-current condition. A crowbar circuit is connected to the power supply output. The crowbar circuit includes over-voltage sensing means. In the event of a failure in the power supply resulting in an excessive voltage at its output, the crowbar circuit is actuated to short the power supply output to ground.

By shorting to ground, substantial current is drawn through the fuse 11 causing it to open and thereby disconnect the load from the power supply. This crowbar circuit is utilized to prevent possible damage to the load due to the overvoltage condition.

A power source utilizing a DC to DC converter for powering a microprocessor is illustrated in FIG. 2. A full disclosure of such a system is given in U.S. Pat. No. 4,355,277 issued Oct. 19, 1982, and entitled Dual-Mode DC/DC Converter, the disclosure of which is hereby incorporated by reference.

When it is desired to use a single cell battery or other low voltage power source, a DC to DC converter can be used to provide an appropriate stepped up output voltage such as 3 volts, to power a microprocessor circuit or other load. An output capacitor 13 is provided for filtering the output waveform of the DC to DC converter. A switch (not shown) can be utilized to connect the power source to the DC to DC converter.

In certain modes of operation, a microprocessor can represent a very small load on a circuit. For example, a CMOS microprocessor which is only being utilized for counting or timing purposes may draw as little as 5 to 10 microamps of current at 3 volts. This small current drawn by the microprocessor can present a problem in that even when the DC to DC converter is turned off, the filter capacitor 13 can supply the actual voltage and current requirements of the microprocessor for a finite but considerable time interval.

The fact that the microprocessor can operate from this stored charge becomes a significant problem in applications such as radio pagers in which the microprocessor is used as a controller. In the case of paging receivers and many similar devices, the devices are commonly designed to generate an audible or visual turn-on signal when the power switch is turned on to indicate that the device is operating properly, and in the case of battery powered equipment, that the batteries contain sufficient energy to operate the device.

In applications of this type, it is important that the control circuitry be reset or initialized quickly whenever the power switch is turned off so that a turn on alert signal can be generated as soon as the power switch is turned on. In the specific case of the microprocessor controller used in a paging receiver, it thus becomes desirable to reset the microprocessor every time the power switch is turned OFF.

Previous to the use of microprocessors as decoders or controllers in paging receivers, conventional analog and digital circuits that operated directly from the battery voltage were used as decoders, and these circuits were quickly reset by the sudden drop in supply voltage when the power source was disconnected. The combined use of a DC-DC converter and a microprocessor presents a new problem in that momentary interruptions in the power source do not effect the output voltage of the DC-DC converter due to the stored charge on the filter capacitor, with the result that fairly long disruptions in the power source do not reset the microcomputer. The net effect is that a pager user might turn the device off, then turn it on again several seconds later and the pager may not generate a turn on alert signal leading the user to believe that his pager battery is dead.

This invention provides a solution to this problem.

SUMMARY OF THE INVENTION

This power supply circuit utilizes a crowbar circuit to assure that the voltage input to the microprocessor goes low whenever power to the DC to DC converter is interrupted.

In one aspect of the invention, the power supply circuit includes a DC to DC converter having an input and an output. A source of potential such as a single cell battery is utilized for supplying an operating voltage to the input. A switch means connects the battery to the input. The means is connected to the output. A crowbar circuit, connected to the input and output of the converter, is responsive to the voltage at the input for selectively discharging the capacitor.

In an aspect of the invention, the crowbar circuit includes a first sensor that senses the input voltage and a second sensor that senses the output voltage. When the first sensor senses a low voltage and the second sensor senses a high voltage the crowbar circuit actuates to discharge the capacitor.

In another aspect of the invention, the crowbar circuit is responsive to a drop in voltage at the input of the DC to DC converter for discharging the capacitor.

In yet another aspect of the invention, the crowbar circuit includes a first transistor deriving its base bias from the input voltage. A current source is connected between the output of the converter and the first transistor with the first transistor operatively connecting the current source to ground when the input voltage is greater than a predetermined value. A second transistor is operatively connected to the output of the dc to dc converter and to ground. The current source supplies base current to turn on the second transistor when the input voltage is less than the predetermined value. In still another aspect of the invention, a third transistor is operatively connected between the output and the base of the second transistor and is biased on for supplying base current to the second transistor when the second transistor is turned on.

BRIEF DESCRIPTION OF THE DRAWINGS

FIG. 1 illustrates a block diagram of a prior art power supply circuit utilizing a crowbar;

FIG. 2 illustrates a prior art circuit utilizing a DC to DC converter for powering a microprocessor;

FIG. 3 is a block diagram of the improved power supply circuit utilizing a crowbar;

FIG. 4 is an electrical schematic drawing of the crowbar circuit of FIG. 3.

DESCRIPTION OF THE PREFERRED EMBODIMENT

Referring now by characters of reference to the drawings and first to FIG. 3, it will be understood that the power supply circuit includes a DC to DC converter 10. A battery 20 is connected to a B+ input of the DC to DC converter 10 as by switch 22 constituting power switching means. The DC to DC converter has a B++ output which is connected to power a microprocessor 12. In the preferred embodiment the battery 20 provides a B+ voltage of approximately 1.5 volts and the DC to DC converter 10 provides a B++ voltage of approximately 3 volts.

A capacitor 24 constituting capacitor means is connected between the B++ output and ground. The capacitor 24 can be solely a filter capacitor or can represent additional distributed capacitance which may be connected to the B++ output of the converter 10. A crowbar circuit 14 is connected to the B++ output of the DC to DC converter 10 and has a input connected to the B+ input of the DC to DC converter. Conventionally, the DC to DC converter 10, Micro-Processor 12 and crow-bar 14 have ground or common connections (not shown).

Referring now to FIG. 4, the preferred embodiment of the crowbar circuit 14 will be discussed. A transistor Q1 is utilized to trigger the circuit. The base of Q1 is connected by resistor 30 to the switched B+ input of the DC to DC converter 10. Transistor Q1 provides a first sensor which is connected to the input of the DC to DC converter and is responsive to a low voltage condition for actuating the crowbar circuit 14.

A current source 32 is connected between the B++ output and the collector of Q1. The emitter of Q1 is connected to ground. When a voltage is present on the switched B+ input, Q1 will be maintained in an on condition providing a current path for the current source 32 to ground. The current source 32 provides a second sensor which is responsive to a high voltage condition at the output of the DC to DC converter for actuating the crowbar circuit 14.

A transistor Q2 has its base connected to the output of the current source 32 with its emitter connected to ground and its collector connected to the B++ output of the DC-DC converter as by resistor 34.

A transistor Q3 is connected with its emitter to the B++ output of the DC-DC converter, its base to the collector of Q2 and its collector, as by a resistor 36, to the base of Q2.

It is thought that the functional advantages and features of the circuit have become fully apparent from the foregoing description of parts, but for completeness of disclosure a brief description of the operation of the circuit will be given. It will be understood, referring to FIG. 3, that when the switch 22 is initially closed, the DC to DC converter will be powered up supplying an output B++ voltage which charges the output capacitor 24 and provides the output voltage to the microprocessor or other loads.

The current source 32, shown in FIG. 4, is powered by the B++ line to provide the second sensor and generates a small current flow through transistor Q1. Transistor Q1, which has been biased on by the switched B+ voltage at the input of the DC-DC converter 10 provides the first sensor. The base of transistor Q2 is pulled low by transistor Q1 keeping transistor Q2 turned off and preventing substantial current flow through the crowbar circuit.

When the switch 22 is opened, the switched B+ voltage at the input of the DC to DC converter 10 will quickly drop while the B++ voltage appearing on the capacitor 24 can remain high for a relatively substantial period of time. As the B+ switched voltage drops to a predetermined low value transistor Q1 will turn off, triggering a bypassing of the voltage on capacitor 24 to ground.

With transistor Q1 off, the small current flow from the current source 32 will be injected into the base of transistor Q2 turning it on. Current will flow from the B++ line through resistor 34 through transistor Q2 to ground. This current flow will bias transistor Q3 on which, in turn supplies additional base current to transistor Q2 through resistor 36. The current flow to ground will quickly drop the B++ voltage, which can thereby allow an internal reset to occur in the microprocessor. This internal reset is commonly generated in microprocessors whenever the supply voltage drops below approximately 1.0 volt.

The crowbar circuit is only actuated when two conditions are met. First, the first sensor, transistors Q1 must sense a low voltage corresponding to the opening of the switch 22. Second, the second sensor, current source 32 must sense a voltage on capacitor 24.

On repowering of the DC to DC converter, the discharged output capacitor 24 introduces a rise time delay in B++ voltage thereby assuring that other circuits, as for example a clock oscillator have sufficient time to begin oscillation prior to the loss of the low voltage reset signal of the microprocessor.

We claim as our invention:

1. A power supply circuit comprising:
a DC to DC converter having an input and an output,
a source of potential for supplying an operating voltage to said input,
a switch means selectively connecting the source of potential to the input of the converter,
a capacitor means connected to said output,
a crow-bar circuit connected to said output and including a first sensor connected to said input of said DC to DC converter and responsive to the voltage at said input for selectively discharging said capacitor means when voltage at said input is less than a predetermined value.

2. A power supply circuit defined in claim 1 in which: the source of potential is a single cell battery.

3. A power supply circuit comprising:
a DC to DC converter having an input and an output,
a source of potential for supplying an operating voltage to said input,
a switch means selectively connecting the source of potential to the input of the converter,
a capacitor means connected to said output,
a crow-bar circuit connected to said output and including a first sensor connected to said input of said DC to DC converter and responsive to the voltage at said input for selectively discharging said capacitor means when voltage at said input is less than a predetermined value,
a crow-bar circuit including:
a first transistor comprising said first sensor and having a base deriving its bias from the voltage at the input, a current source comprising a second sensor and connected between the output and the first transistor, the first transistor operatively connecting the current source to ground when the voltage at the input is greater than a predetermined value, and a second transistor selectively operatively connecting the output to ground, the current source supplying base current to turn on the second transistor when said input voltage is less than the predetermined value.

4. A power source supply circuit as defined in claim 3 in which:

a third transistor is operatively connected between the output and the base of the second transistor, the third transistor being biased on for supplying base current to the second transistor when the second transistor is turned on.

* * * * *